United States Patent [19]

Heinle

[11] Patent Number: 5,128,853

[45] Date of Patent: Jul. 7, 1992

[54] DAMPING RESONANT OSCILLATIONS IN A PARALLEL RESONANT INVERTER

[75] Inventor: Georg Heinle, Erlangen, Fed. Rep. of Germany

[73] Assignee: Siemens Aktiengesellschaft, Berlin & Munich, Fed. Rep. of Germany

[21] Appl. No.: 652,423

[22] Filed: Feb. 7, 1991

[30] Foreign Application Priority Data

Feb. 7, 1990 [EP] European Pat. Off. ........ 90102429.9

[51] Int. Cl.$^5$ ............................................ H02M 1/12
[52] U.S. Cl. .......................................... 363/41; 363/95
[58] Field of Search ...................... 363/34, 37, 39, 40, 363/41, 95, 96, 137

[56] References Cited

U.S. PATENT DOCUMENTS

| | | | |
|---|---|---|---|
| 4,504,895 | 3/1985 | Steigerwald | 363/132 |
| 4,654,773 | 3/1987 | Ito et al. | 363/41 |
| 4,954,726 | 9/1990 | Lipman et al. | 307/46 |
| 4,964,027 | 10/1990 | Cook et al. | 363/40 |
| 5,001,619 | 3/1991 | Nakajima et al. | 363/96 |
| 5,001,622 | 3/1991 | Kirchberg et al. | 363/95 |

FOREIGN PATENT DOCUMENTS 0259240 3/1988 European Pat. Off. .
0161738 10/1988 European Pat. Off. .

OTHER PUBLICATIONS

Georg Stanke, Untersuchung Von Modulationsverfahren Für Pulsstromrichter Mit Hohen Dynamischen Anforderungen Bei Beschränkter Schaltfrequenz (Dissertation by Georg Stanke), Dec. 18, 1987, Chapters 4.2 and 4.4.2.
Siemens, Din 41 761-Static Power Converters; Static Power Converter Circuits, Denomination and Code Designation, Examples, May 1975, p. 2.
IEEE Transactions on Industry Applications, vol. 25, No. 1, Feb. 28, 1989; N.Y., US, pp. 76–84.
Conference Record of the 1987 IEEE Industry Applications Society, Annual Meeting, Part I, Oct. 23, 1987, pp. 303–311.
IEEE Transactions on Industry Applications, vol. IA-21, No. 5, Sep./Oct. 1985, pp. 1192–1198.

*Primary Examiner*—Jeffrey Sterrett
*Attorney, Agent, or Firm*—Kenyon & Kenyon

[57] ABSTRACT

A control process and trigger equipment damps resonant oscillations of a parallel-resonant circuit for a pulse-controlled inverter of a current-source inverter. The pulse-controlled inverter contains turn-off current-converter switches and is linked to an inductive and to a capacitive load. This inductive and capacitive load forms a parallel-resonant circuit. A modulation mode is selected from several stored modulation modes from the system frequency ($f_1$) of the converter current ($I_R$). Depending upon a calculated factor ($f_1/f_{res}$) and the selected modulation mode, switching angles ($\alpha_1, \alpha_2, \ldots, \alpha_n$) are determined depending upon system frequency by means of stored, pre-set switching angles. From these switching angles the control times for the pulse-controlled inverter are then generated. Thus, the pulse edges of a selected modulation mode can be adjusted with the system frequency as a function of frequency, enabling the resonant oscillations to be adequately damped over the entire system frequency range.

6 Claims, 6 Drawing Sheets

DAMPING RESONANT OSCILLATIONS IN A PARALLEL RESONANT INVERTER

BACKGROUND OF THE INVENTION

The invention relates generally to control processes and trigger equipment, and more particularly to such processes and equipment for damping resonant oscillations of a parallel-resonant circuit for a pulse-controlled inverter of a current-source inverter, in which the pulse-controlled inverter contains turn-off current-converter switches and is linked to an inductive and to a capacitive load, which form the parallel-resonant circuit.

When a capacitive load is applied electrically parallel to the inductive load of the pulse-controlled inverter of a current-source inverter, a parallel-resonant circuit is formed, whose resonant frequency is a large multiple of the system nominal frequency $f_{1n}$. By applying pre-determined modulation modes, such as 3-times pulsation, 5-times pulsation, and 7-times pulsation, the frequency of the fifth or seventh harmonic, and the frequency of the eleventh or thirteenth harmonic, come into the immediate proximity of the resonant frequency $f_{res}$ of the parallel-resonant circuit in the upper system frequency range. This causes the resonant circuit to be strongly excited, resulting in the load current showing resonant oscillations. Due to these resonant oscillations in the load current, the power loss of the load increases considerably.

The strong excitation of the resonant circuit in the upper system frequency range can be reduced by applying a modulation mode with high pulsation, such as a 13-times pulsation, in the system frequency range. The switching angle and thus the control times are thereby pre-determined in a way which allows the amplitudes of the harmonics to be as small as possible. However, the disadvantage is that for the middle and low system frequency range, the modulation modes show still higher pulsations or that the entire low system frequency range must be controlled asynchronously. In addition, the degree of complexity for pre-determined, optimized pulse patterns rises with the pulse number, as does the power loss of the pulse-controlled inverter.

The present invention is directed to the problem of developing a simple control process for damping these resonant oscillations without increasing the power loss of the pulse-controlled inverter, and to developing a trigger equipment for a pulse-controlled inverter of a current-source inverter, whereby a modulation mode of a lower pulse number can also be applied, particularly in the upper system frequency range without resulting in significant power losses.

SUMMARY OF THE INVENTION

The present invention solves this problem by selecting a modulation mode from several stored modulation modes of a system frequency of a converter current. Depending upon a calculated factor and upon the selected modulation mode, switching angles are determined as a function of system frequency by means of stored, pre-set switching angles, from which the control times for the pulse-controlled inverter are then generated.

As a result of this control process, system-frequency-dependent modulation modes with different pulse numbers within one modulation mode, the pulse pattern, and the switching angle are able to be varied as a function of the system frequency. This means that the pulse edges of a selected modulation mode are adjusted, depending upon frequency, with the system frequency, and with the frequency distance to the resonant frequency. In this manner, a modulation mode optimized for a specific system frequency shows minimal amplitudes of harmonics of the system frequency, not only for this system frequency, but for every system frequency within a frequency range established by this modulation mode. This means that, within one system frequency range, one can control the modulation mode for each system frequency within this frequency range to result in minimal amplitudes of the harmonics. Consequently, resonant oscillations are sufficiently damped over the entire system-frequency range, particularly the upper system-frequency range, without applying a modulation mode of a higher pulse number.

In addition, the individual switching-angle values are determined from equations specified by the present invention.

The present invention solves the problem of developing a trigger equipment for a pulse-controlled inverter of a current-source inverter, in which the pulse-controlled inverter has current switches, by linking an inductive and capacitive load to the current switches, and forming a parallel-resonant circuit having a resonant frequency ($f_{res}$). The trigger equipment has a memory containing tables of pre-set switching angles as a function of frequency range and system frequency divided by resonant frequency. The trigger equipment also has a device generating the control times which is coupled in series with the memory. A device identifying the system frequency range is coupled to the memory. A divider dividing the first input by the second input is coupled to the memory, whereby a system frequency ($f_1$) is applied to the input of the identifying device and is also applied to the first input of the divider, and the resonant frequency ($f_{res}$) is applied to the second input of the divider.

According to the present invention, the trigger equipment can also be a microcomputer that is programmed to perform the functions of the individual devices making up the trigger equipment as described above.

DETAILED DESCRIPTION

Figure 1A:
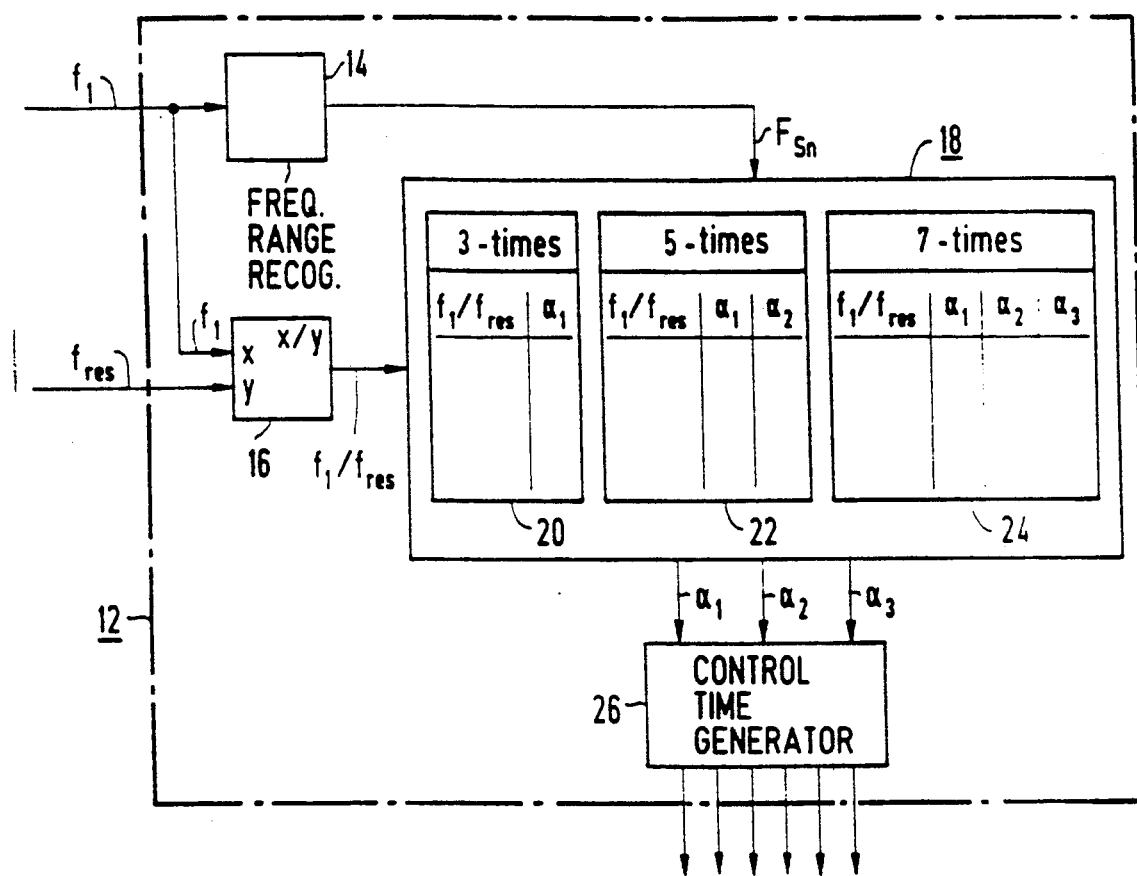
FIG. 1 depicts the trigger equipment and the corresponding current-source inverter.
Figure 1B:
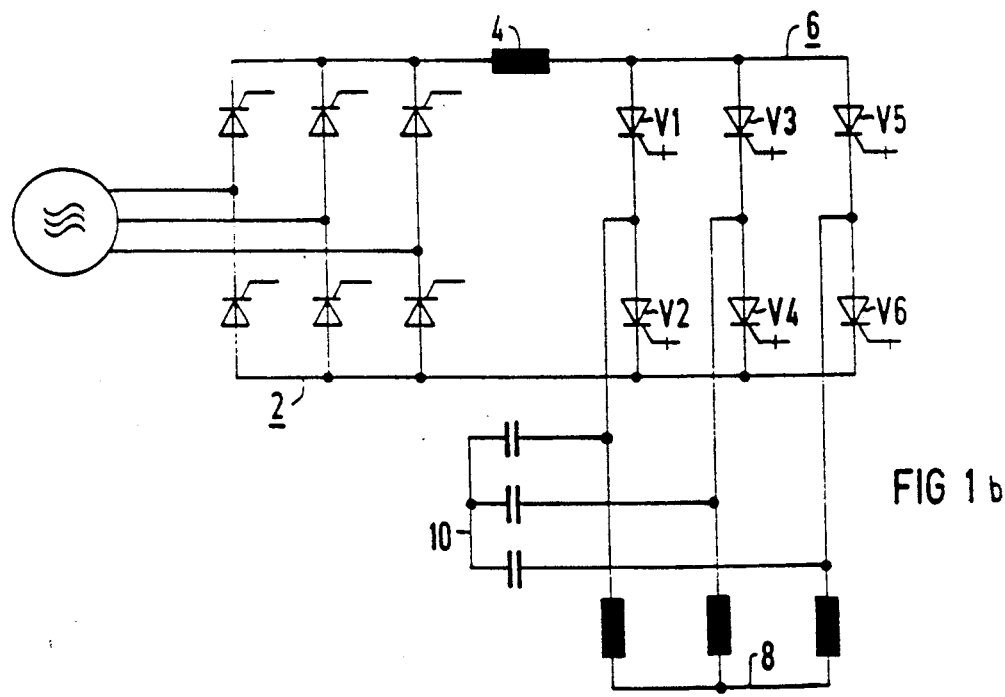

Referring to FIG 1, a current-source inverter consists of a self-commutated line-current converter 2, an inductor 4 and a pulse-controlled inverter 6. The pulse-controlled inverter 6 has an inductive load 8 (e.g. an asynchronous motor) that is in parallel with a capacitive load 10, which consists of three star-connected capacitors. The inverter 6 consists of a current converter constructed as a 6-pulse bridge circuit, also known as a B6-circuit, such as that disclosed in Deutsche Normen, DIN 41761 Beiblatt, May 1975, p. 2, Table 1.1. Turn-off converter switches (e.g. transistors or gate-turn-off thyristors) are provided as converter switches V1 to V6. A parallel-resonant circuit develops through the capacitors combined with the inductive load. The resonant frequency $f_{res}$ of the parallel resonant circuit is a large multiple of the system nominal frequency $f_{1n}$.

The control times and the trigger signals for the turn-off converter switches V1 to V6 are generated by the trigger equipment 12. The system frequency $f_1$ and the resonant frequency $f_{res}$ are fed to this trigger equipment 12 on the input side. The system frequency $f_1$ is fed to a device 14 which recognizes the system frequency range, fed to the first input of a divider 16, and also fed to a control time generator 26. A control time generator that generates the control times such as in the present invention is known from the dissertation "Examination of Modulation Methods for Pulse Current Converters with High Dynamic Requirements and Restricted Switching Frequency", by G. Stanke, RheinischWestfälischen Technischen Hochschule Aachen, Dec. 18, 1987. The divider divides the first input by the second input. The supplied resonant frequency $f_{res}$ is applied to the second input of the divider 16. As an example, the device 14 which recognizes the system frequency range can be constructed of several window comparators, where the number of comparators is dependent upon the number of system frequency ranges. In the depicted exemplified embodiment, the entire system frequency range 0 Hz $\leq f_1 \leq 50$ Hz is divided into three ranges, according to the control curve of FIG. 2. A signal $F_{sn}$ indicating the system frequency range is output from the device 14. The divider 16 calculates the factor $f_1/f_{res}$, which specifies the ratio between the system frequency $f_1$ and the resonant frequency $f_{res}$. The resonant frequency $f_{res}$ of the parallel-resonant circuit is a constant. Thus, the divider 16 can be replaced by a constant term to weight the system frequency $f_1$. This factor $f_1/f_{res}$ and the signal $F_{sn}$ are fed to a memory 18, in which several values are stored in tables 20, 22 and 24. Switching angles $\alpha_1$, or $\alpha_1$ and $\alpha_2$, or $\alpha_1$, $\alpha_2$, and $\alpha_3$ are read out from one of the three stored tables depending upon the factor $f_1/f_{res}$ and the signal $F_{sn}$. The switching angles are then output from the memory 18. These switching angles $\alpha_1$, or $\alpha_1$ and $\alpha_2$, or $\alpha_1$, $\alpha_2$, and $\alpha_3$ are fed to the control time generator 26. In the simplest case, a microcomputer is used as a device 26. These calculated control times and trigger signals each reach the turn-off converter switches V1 to V6 via a trigger circuit (not shown).

Figure 3:
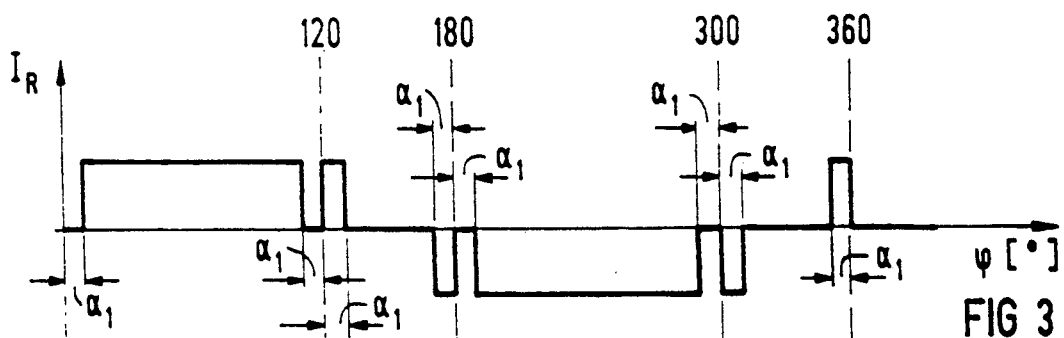
FIGS. 3 to 5 illustrate various modulation modes (3-times, 5-times and 7-times pulsation) as a function of the phase angle $\psi$.
Figure 4:
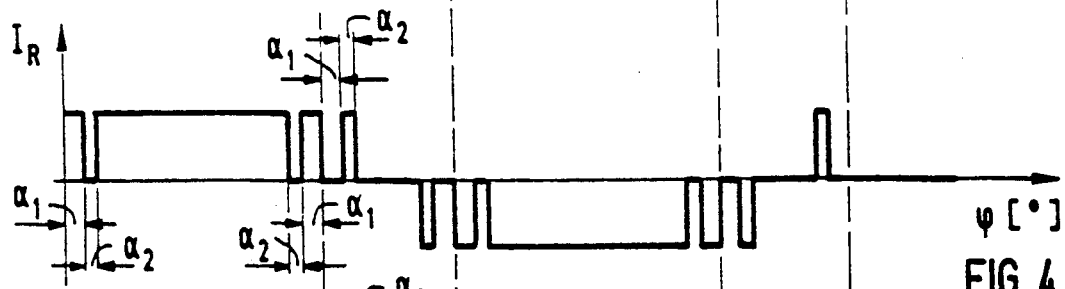
Figure 5:
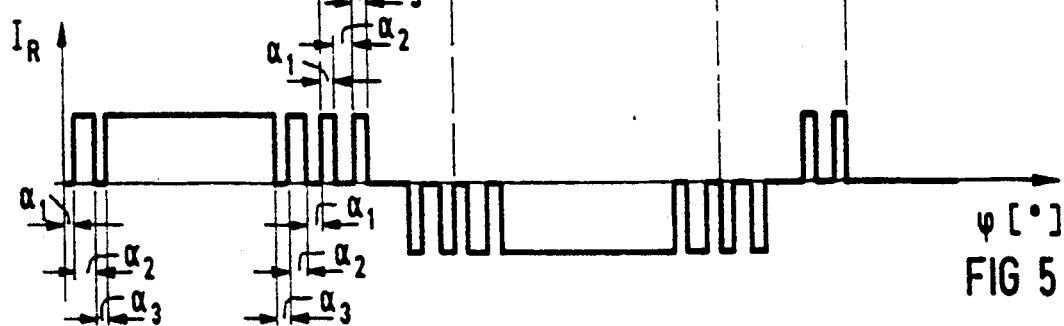

FIGS. 3 to 5 illustrate in greater detail how modulation modes with 3-times, 5-times, and 7-times pulsation are generated from the switching angles $\alpha_1$, or $\alpha_1$ and $\alpha_2$, or $\alpha_1$, $\alpha_2$, and $\alpha_3$, respectively. The generation of control times from switching angles is generally known in the art.

Figure 2:
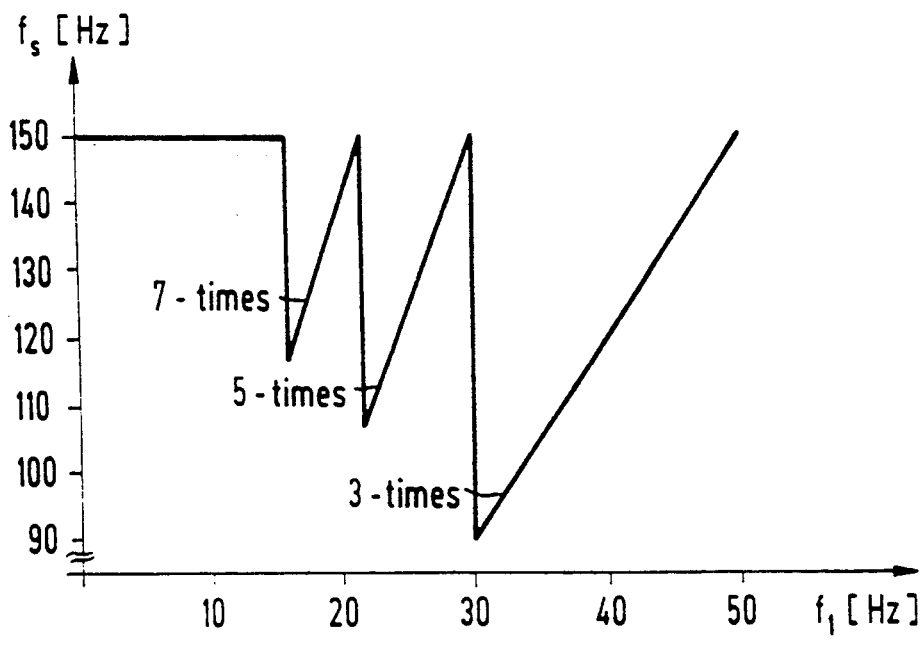
FIG. 2 depicts a control curve as a function of the system frequency $f_1$.

In FIG. 2, a control curve is depicted as a function of the system frequency $f_1$. An asynchronous control takes place in the frequency range 0 Hz $\leq f_1 \leq 17$ Hz during the constant portion of the curve. In the next frequency range 17 Hz 23 $f_1 \leq 21$ Hz, the control is carried out synchronously, whereby seven current pulses occur per half cycle. The control is carried out with a 5-times pulsation in the frequency range 21 Hz $\leq f_1 \leq 30$ Hz where five current pulses occur per half cycle, and with a 3-times pulsation in the frequency range 30 Hz $\leq f_1 \leq 50$ Hz, where three current pulses occur per half cycle. These frequency ranges are chosen as an example. The technical literature sufficiently describes such characteristics.

Figure 6:
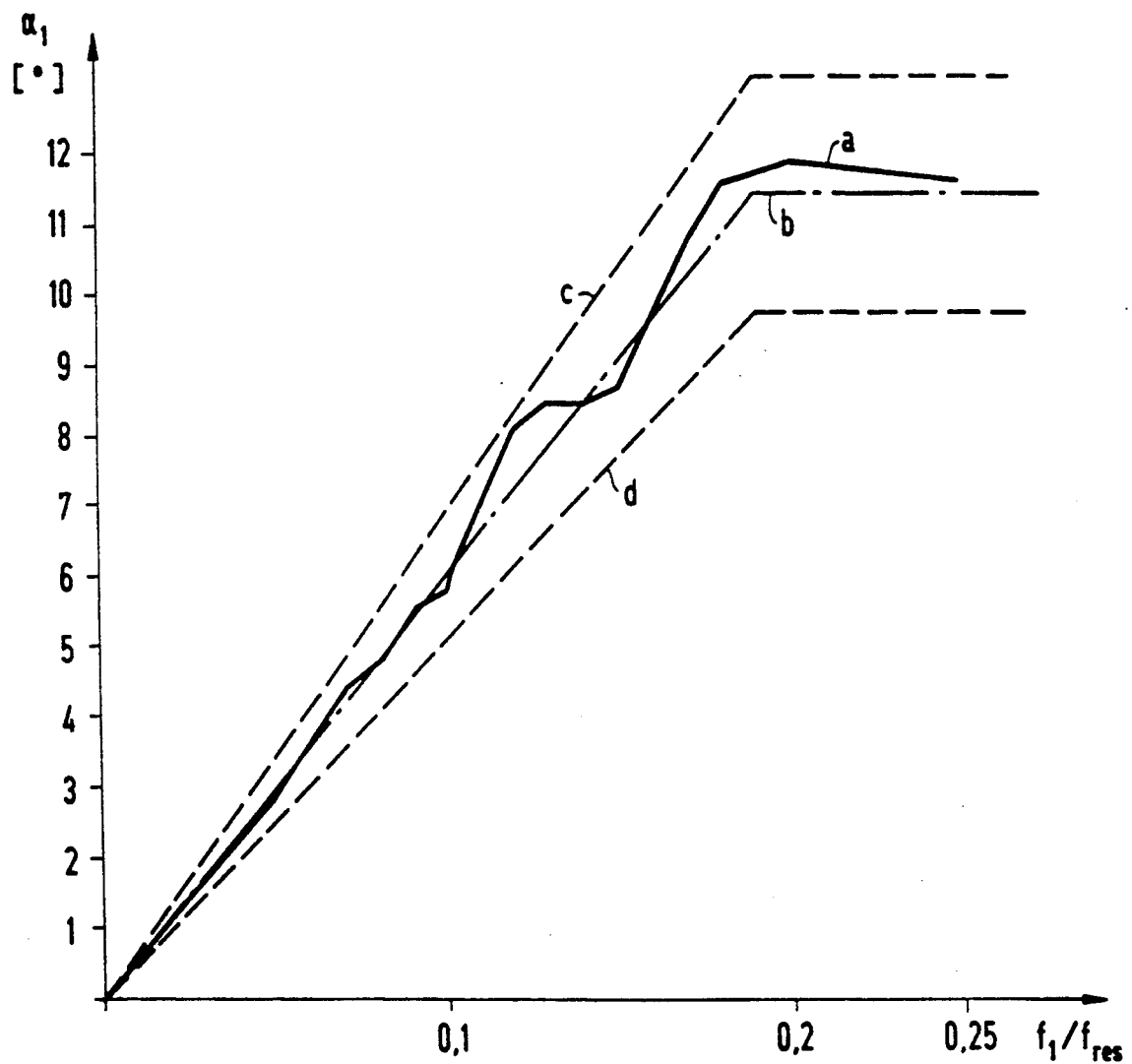
FIG. 6 shows switching-angle curves of the switching angle $\alpha_1$ of a modulation mode with 3-times pulsation as a function of the factor $f_1/f_{res}$.

In FIG. 6, switching angle curves of the switching angle $\alpha_1$ are depicted for a 3-times pulsation as a function of the factor $f_1/f_{res}$. The solid characteristic curve a represents the ideal switching angle curve, which can be replaced with good approximation by the curve b. Moreover, one can also shift the curve b within the limiting curves c and d, without adversely affecting the result, namely the damping of resonant oscillations. This switching-angle curve b consists of two linear segments, which intersect at $f_1/f_{res}=0.19$. The first linear segment is defined by the following line equation:

$$\alpha_1 = 60 f_1/f_{res}, \text{ for } 0 \leq f_1/f_{res} \leq 0.19.$$

The second linear segment is defined by:

$$\alpha_1 = 11.4°, \text{ for } f_1/f_{res} > 0.19.$$

The upper limiting curve is likewise defined by means of two line equations:

$$\alpha_{up} = 1.2 \cdot 60 \cdot f_1/f_{res}, \text{ for } 0 \leq f_1/f_{res} \leq 0.19; \text{ and}$$
$$\alpha_{up} = 13.7°, \text{ for } f_1/f_{res} \geq 0.19.$$

Similarly, the lower limiting curve is defined by means of two line equations:

$$\alpha_{low} = 0.8 \cdot 60 \cdot f_1/f_{res}, \text{ for } 0 \leq f_1/f_{res} \leq 0.19; \text{ and}$$
$$\alpha_{low} = 9.1°, \text{ for } f_1/f_{res} \geq 0.19.$$

The above line equations for the approximate curve b, the upper limiting curve c, and the lower limiting curve d apply only to a 3-times pulsation.

Figure 10:
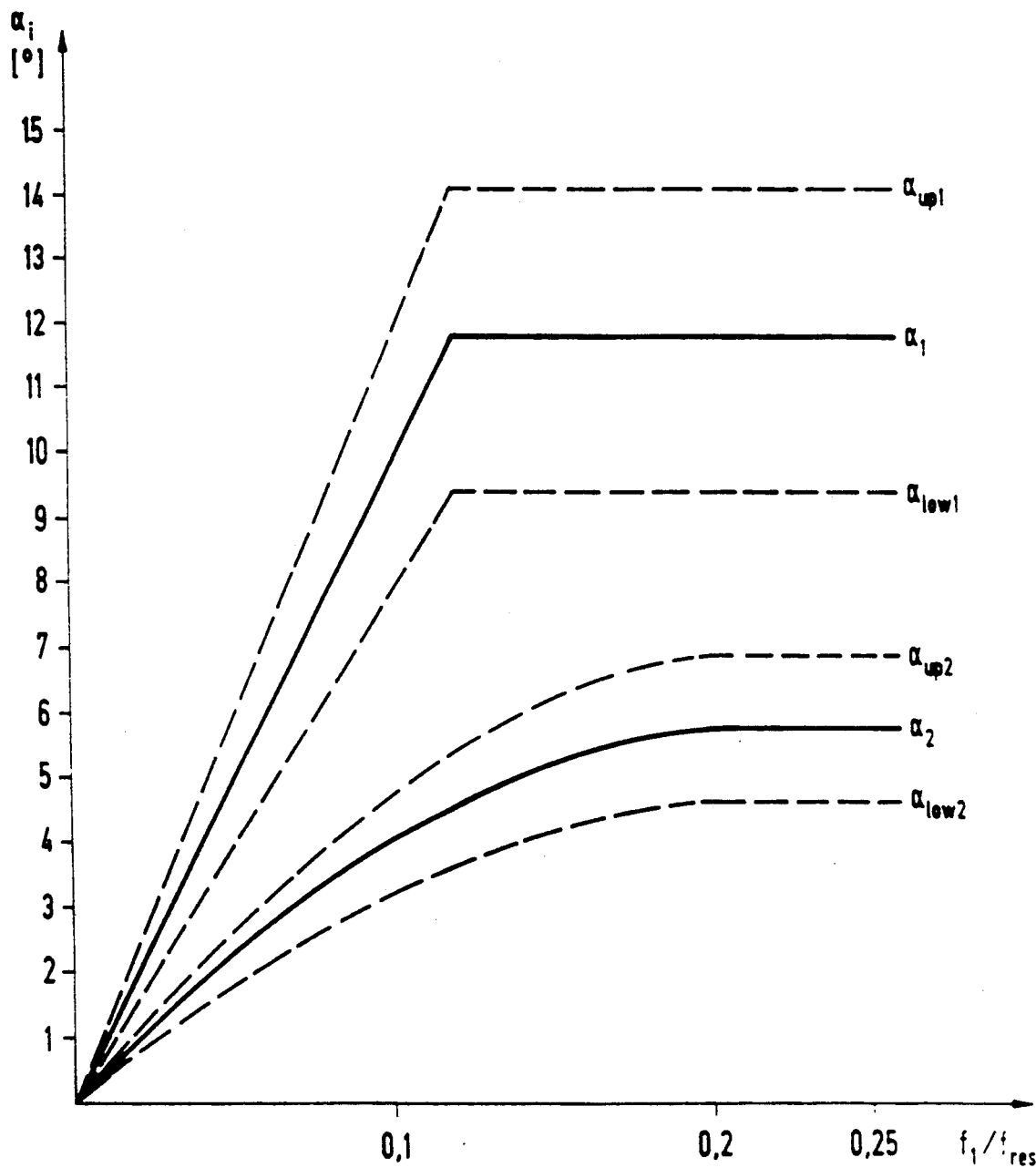
FIG. 10 shows switching-angle curves of the switching angle $\alpha_1$ of a modulation mode with 5-times pulsation as a function of the factor $f_1/f_{res}$.

In FIG 10, switching angle curves of the switching angles $\alpha_1$ 1 and $\alpha_2$ are depicted for a 5-times pulsation as a function of the factor $f_1/f_{res}$. The solid curves represent the ideal switching-angle curves. As in the case for the 3-times pulsation, one can shift the actual curve within the limiting curves, shown in dashed lines. The following equations apply for a 5-times pulsation:
Approximate switching-angle curve:

$$\alpha_1 = 98 \cdot f_1/f_{res} \text{ for } 0 \leq f_1/f_{res} \leq 0.12$$

-continued $\alpha_1 = 11.8°$ for $f_1/f_{res} > 0.12$
$\alpha_2 = 51.5° \cdot f_1/f_{res} - 114 \cdot (f_1/f_{res})^2$ for $0 \leq f_1/f_{res} \leq 0.2$
$\alpha_2 = 5.74°$ for $f_1/f_{res} > 0.2$ Upper limiting switching-angle characteristic curve:

$\alpha_{up1} = 1.2 \cdot \alpha_1$ $\alpha_{up2} = 1.2 \cdot \alpha_2$

Lower limiting switching-angle characteristic curve d:

$\alpha_{low1} = 0.8 \cdot \alpha_1$ $\alpha_{low2} = 0.8 \cdot \alpha_2$

Figure 11:
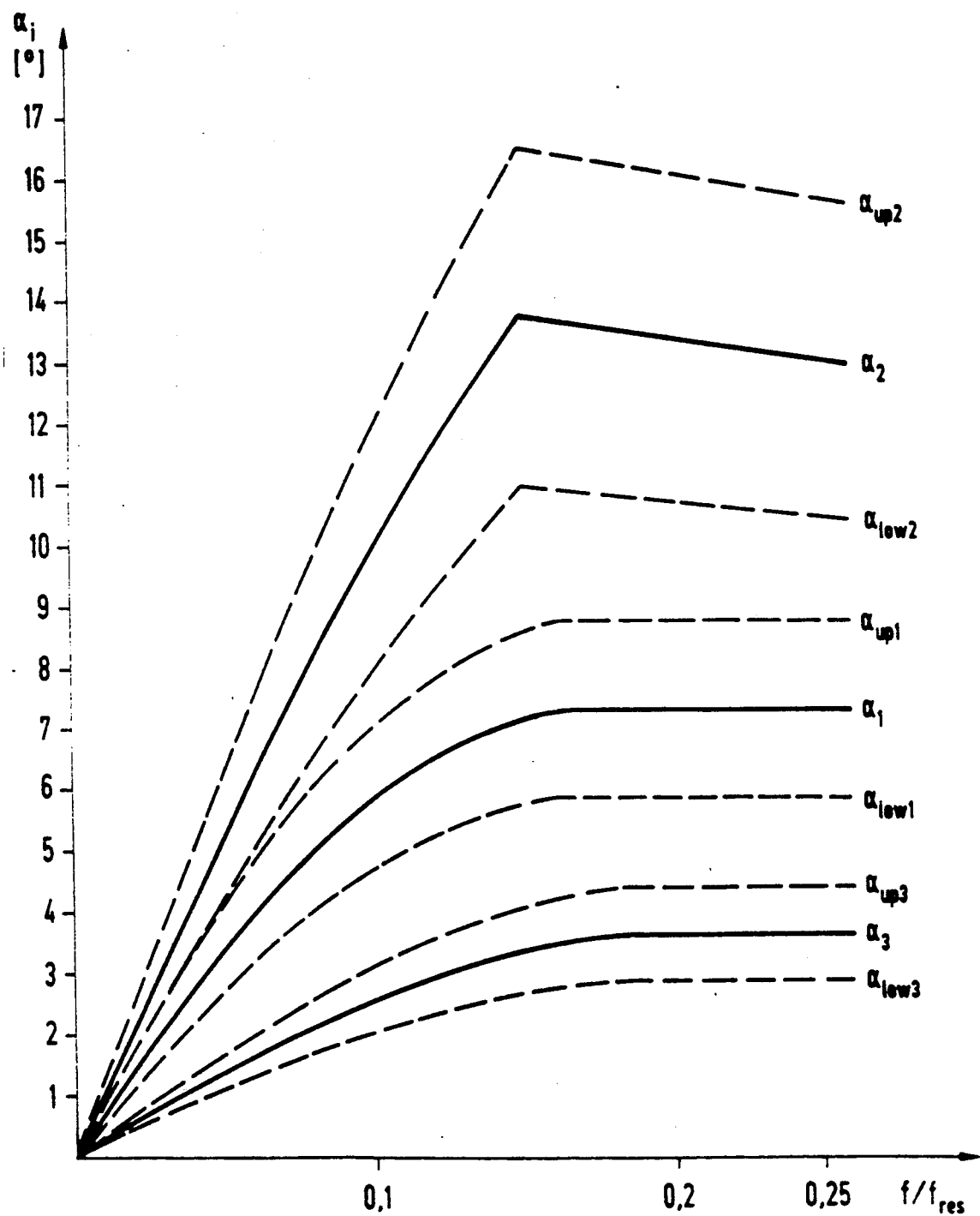
FIG. 11 shows switching-angle curves of the switching angle $\alpha_1$ of a modulation mode with 7-times pulsation as a function of the factor $f_1/f_{res}$.

In FIG. 11, switching angle curves of the switching angles $\alpha_1$, $\alpha_2$ and $\alpha_3$ are depicted for a 7-times pulsation as a function of the factor $f_1/f_{res}$. The solid curves represent the ideal switching-angle curves. As in the case for the 3-times pulsation, one can shift the actual curve within the limiting curves, shown in dashed lines. The following equations apply for a 7-times pulsation:
Approximate switching-angle characteristic curve:

$\alpha_1 = 79.4 \cdot f_1/f_{res} - 210 \cdot (f_1/f_{res})^2$ for $0 \leq f_1/f_{res} \leq 0.16$
$\alpha_1 = 7.3°$ for $f_1/f_{res} > 0.16$
$\alpha_2 = 113 \cdot f_1/f_{res} - 141 \cdot (f_1/f_{res})^2$ for $0 \leq f_1/f_{res} \leq 0.15$
$\alpha_2 = 14.75° - 6.5 \cdot f_1/f_{res}$ for $f_1/f_{res} > 0.15$
$\alpha_3 = 33 \cdot f_1/f_{res} - 70 \cdot (f_1/f_{res})^2$ for $0 \leq f_1/f_{res} \leq 0.18$
$\alpha_3 = 3.7°$ for $f_1/f_{res} > 0.18$ Upper limiting switching-angle characteristic curve:

$\alpha_{up1} = 1.2 \cdot \alpha_1$ $\alpha_{up2} = 1.2 \cdot \alpha_2$ $\alpha_{up3} = 1.2 \cdot \alpha_3$ Lower limiting switching-angle characteristic curve:

$\alpha_{low1} = 0.8 \cdot \alpha_1$ $\alpha_{low2} = 0.8 \cdot \alpha_2$ $\alpha_{low3} = 0.8 \cdot \alpha_3$ These switching-angle characteristic curves show that the switching angle $\alpha_1$ is not constant within a pre-set system frequency range, which would make the pulse pattern always identical in the frequency range, but rather it varies depending upon the distance between the system frequency $f_1$, and also the harmonic frequency, and the resonant frequency $f_{res}$. For that reason, for every system frequency $f_1$, one obtains a pulse pattern with a constant pulse number (for example 3-times pulsation), however with differing switching angles $\alpha_1$. Consequently, switching angles $\alpha_1$, or $\alpha_1$ and $\alpha_2$, or $\alpha_1$, $\alpha_2$, and $\alpha_3$ can be first calculated and stored by means of an approximate curve, which must lie within the sector formed by the upper and lower limiting curves. Through this means, the harmonics are adequately suppressed at every system frequency $f_1$.

Figure 7:
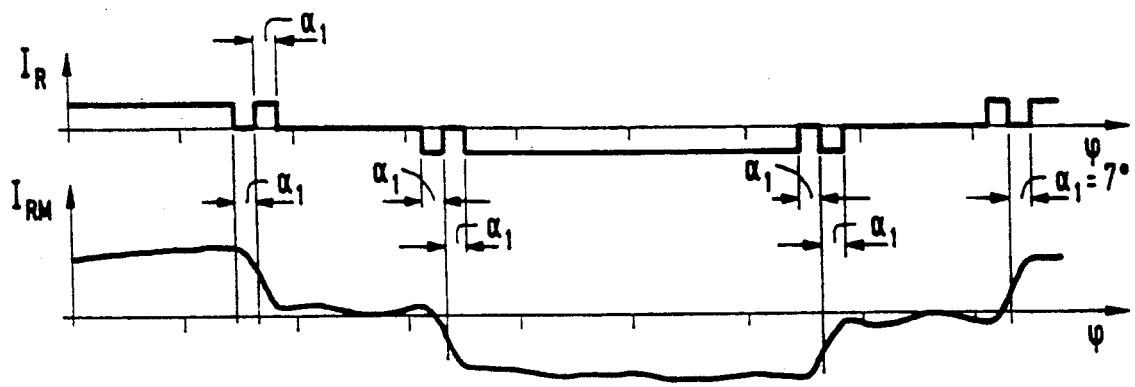
FIG. 7 shows the converter current and the load current for an optimized modulation mode with 3-times pulsation each depicted as a function of the phase angle $\psi$ at a system frequency of $f_1 = 50$ Hz.

FIG. 7 depicts the converter current $I_R$, and the load current $I_{RM}$, as a function of the phase angle $\psi$. The converter current $I_R$ is depicted as a modulation mode with 3-times pulsation, whereby the switching angle $\psi$. 7°. The system frequency $f_1$ is 50 Hz; that is the system frequency $f_1$ is situated in the fourth system frequency range according to the control curve of FIG. 2. The switching angle $\alpha_1 = 7°$ is dimensioned so that the load current $I_{RM}$ hardly shows any resonant vibration for a system frequency $f_1 = 50$ Hz, in other words the amplitudes of the harmonics are adequately suppressed.

Figure 8:
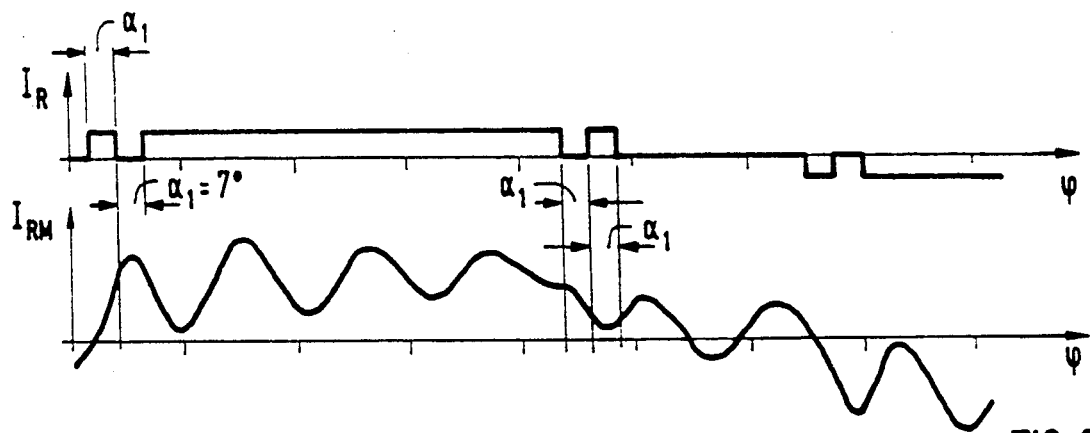
FIG. 8 shows the converter current and the problem with the corresponding load current when using a modulation mode as in FIG. 7, but instead at a system frequency of $f_1 = 40$ Hz, each as a function of the represented phase angle $\psi$.

In a conventional control process, the switching angles $\alpha_1$, $\alpha_2$ and $\alpha_3$ are retained in this frequency range when the system frequency $f_1$ is changed and when a modulation mode is selected. In FIG. 8, the converter current $I_R$ is shown for a system frequency $f_1 = 40$ Hz as a function of the phase angle $\psi$. The corresponding load current $I_{RM}$ is likewise shown as a function of the phase angle $\psi$ in this FIG. 8. At this system frequency $f_1 = 40$ Hz and with an unchanged switching angle $\alpha_1 = 7°$, the amplitude of the load current $I_{RM}$ shows considerable resonant oscillations, causing the amplitude of the load current $I_{RM}$ to nearly double. As a result, the power loss increases considerably in the load in FIG. 8.

Figure 9:
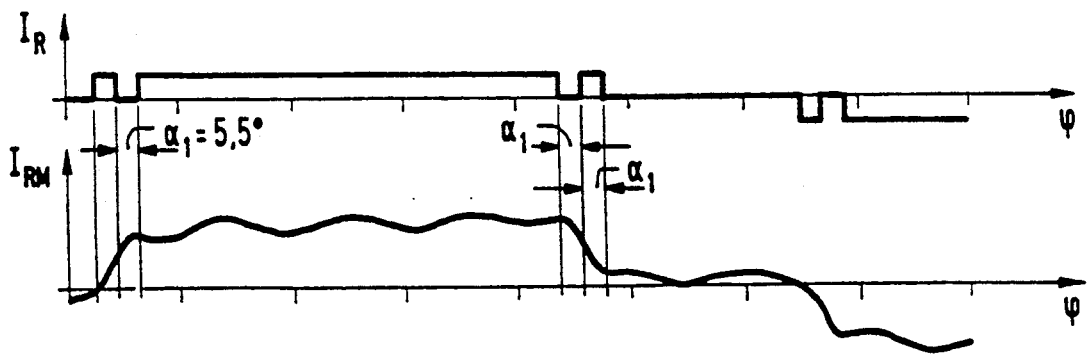
FIG. 9 depicts the converter current and the load current for a modulation mode with 3-times pulsation as a function of the phase angle $\psi$, at a system frequency of $f_1=40$ Hz, whereby the switching angle $\alpha_1$ is determined by means of the control process of the present invention.

In FIG. 9 on the other hand, the converter current $I_R$ is shown for a system frequency $f_1 = 40$ Hz and with a modulation mode as in FIGS. 7 and 8 as a function of the phase angle $\psi$. In the case of this modulation mode with 3-times pulsation, however, the switching angle $\alpha_1$ is reduced to 5.5°. The corresponding load current $I_{RM}$ is also shown as a function of the phase angle in this FIG. Compared to the load current $I_{RM}$ as shown in FIG. 8, the resonant vibration of the load current $I_{RM}$ in FIG. 9 is damped considerably.

At a system frequency of $f_1 = 50$ Hz and a resonant frequency of $f_{res} = 440$ Hz, the seventh and eleventh harmonics are set near the resonant frequency $f_{res}$ of the connected inverter 6. If the system frequency $f_1$ is reduced to 40 Hz, then the frequencies of the harmonics also shift relative to the resonant frequency $f_{res}$. At a system frequency of $f_1 = 40$ Hz and a resonant frequency of $f_{res} = 440$ Hz, the frequency of the eleventh harmonic is exactly equal to the resonant frequency $f_{res}$. In this manner, the parallel-resonant circuit is excited very strongly, causing the load current $I_{RM}$ to oscillate, as in FIG. 8. Now, if one were to adjust the system frequency $f_1$ within the fourth system frequency range to the lower range limit, as in FIG. 2 to a system frequency of $f_1 = 30$ Hz, then the thirteenth harmonic would now appear in the immediate vicinity of the resonant frequency $f_{res}$.

To ensure that the parallel-resonant circuit is not constantly excited by different harmonics when the individual control curves are traversed, the switching angle (s) $\alpha_1$, or $\alpha_1$ and $\alpha_2$, or $\alpha_1$, $\alpha_2$, and $\alpha_3$ of the individual modulation modes, and thus the pulse edges, are adjusted depending upon frequency by the factor $f_1 f_{res}$.

At a factor of $f_1/f_{res} = 50/440 = 0.11$, a switching angle of $\alpha_1 = 7°$ can be derived from the curve of FIG. 6. factor of $f_1/f_{res} = 40/440 = 0.09$ the switching angle $\alpha_1$ is reduced to 5.5°. If one reduces the system frequency $f_1$ to 30 Hz, a factor of $f_1 f_{res} = 30/440 = 0.068$ results, through which the switching angle $\alpha_1$ according to the curve may still only amount to 4.3° if the resonant frequency is to be sufficiently damped.

Thus, with this control process, the switching angle(s) $\alpha_1$, or $\alpha_1$, and $\alpha_2$, or $\alpha_1$, $\alpha_2$, and $\alpha_3$ of the modulation modes, and thus the pulse edges of the converter current $I_R$, are adjusted within a system frequency range depending upon the system frequency, causing the harmonics to be adequately suppressed within the system range.

What is claimed is:

1. A control process for damping resonant oscillations of a parallel-resonant circuit for a pulse-controlled inverter, which has a plurality of current-converter switches, of a current-source inverter, comprising the steps of:
   a) forming a parallel-resonant circuit by linking the current converter switches to an inductive load and to a capacitive load;
   b) storing a plurality of modulation modes and pre-set switching angles;
   c) receiving a system frequency of a converter current;
   d) selecting a selected modulation mode by means of the system frequency from the plurality of stored modulation modes;
   e) calculating a factor ($f_1/f_{res}$);
   f) determining a plurality of switching angles from the stored plurality of pre-set switching angles, depending upon the factor ($f_1/f_{res}$), the selected modulation mode, and the system frequency; and
   g) generating a plurality of control times for the pulse-controlled inverter.

2. The control process according to claim 1, further comprising the step of calculating the plurality of pre-set switching angles for a 3-times pulsation from the following equations:

$$\alpha_1 = 60 \cdot f_1/f_{res} \text{ for } 0 \leq f_1/f_{res} \leq 0.19$$
$$\alpha_1 = 11.4° \text{ for } f_1/f_{res} > 0.19$$
$$\alpha_{up} = 1.2 \cdot \alpha_1$$
$$\alpha_{low} = 0.8 \cdot \alpha_1,$$

wherein $\alpha_1$ is a switching angle, and $\alpha_{up}$ and $\alpha_{low}$ are an upper and a lower limit respectively of $\alpha_1$.

3. The control process according to claim 1, further comprising the step of calculating the plurality of pre-set switching angles for a 5-times pulsation from the following equations:

$$\alpha_1 = 98 \cdot f_1/f_{res} \text{ for } 0 \leq f_1/f_{res} \leq 0.12$$
$$\alpha_1 = 11.8° \text{ for } f_1/f_{res} > 0.12$$
$$\alpha_2 = 51.5° \cdot f_1/f_{res} - 114 (f_1/f_{res})^2 \text{ for } 0 \leq f_1/f_{res} \leq 0.2$$
$$\alpha_2 = 5.74° \text{ for } f_1/f_{res} > 0.2$$
$$\alpha_{up1} = 1.2 \cdot \alpha_1$$
$$\alpha_{low1} = 0.8 \cdot \alpha_1$$
$$\alpha_{up2} = 1.2 \cdot \alpha_2$$
$$\alpha_{low2} = 0.8 \cdot \alpha_2,$$

wherein $\alpha_1$ and $\alpha_2$ are switching angles, $\alpha_{up1}$ and $\alpha_{low1}$ are an upper and a lower limit respectively of $\alpha_1$, and $\alpha_{up2}$ and $\alpha_{low2}$ are an upper and a lower limit respectively of $\alpha_2$.

4. The control process according to claim 1, further comprising the step of calculating the plurality of pre-set switching angles for a 7-times pulsation from the following equations:

$$\alpha_1 = 79.4 \cdot f_1/f_{res} - 210(f_1/f_{res})^2 \text{ for } 0 \leq f_1/f_{res} \leq 0.16$$
$$\alpha_1 = 7.3° \text{ for } f_1/f_{res} > 0.16$$
$$\alpha_2 = 113 f_1/f_{res} - 141(f_1/f_{res})^2 \text{ for } 0 \leq f_1/f_{res} \leq 0.15$$
$$\alpha_2 = 14.75° - 6.5 \cdot f_1/f_{res} \text{ for } f_1/f_{res} > 0.15$$
$$\alpha_3 = 33 \cdot f_1/f_{res} - 70(f_1/f_{res})^2 \text{ for } 0 \leq f_1/f_{res} \leq 0.18$$
$$\alpha_3 = 3.7°$$
$$\alpha_{up1} = 1.2 \cdot \alpha_1$$
$$\alpha_{up2} = 1.2 \cdot \alpha_2$$
$$\alpha_{up3} = 1.2 \cdot \alpha_3$$
$$\alpha_{low1} = 0.8 \cdot \alpha_1$$
$$\alpha_{low2} = 0.8 \cdot \alpha_2$$
$$\alpha_{low3} = 0.8 \cdot \alpha_3,$$

wherein $\alpha_1$, $\alpha_2$, and $\alpha_3$ are switching angles, $\alpha_{up1}$ and $\alpha_{low1}$ are an upper and a lower limit respectively of $\alpha_1$, $\alpha_{up2}$ and $\alpha_{low2}$ are an upper and a lower limit respectively of $\alpha_2$, and $\alpha_{up3}$ and $\alpha_{low3}$ are an upper and a lower limit respectively of $\alpha_3$.

5. A trigger equipment for a pulse-controlled inverter, which has a plurality of current switches, of a current-source inverter, comprising:
   a) an inductive load and a capacitive load being linked to the current switches, and forming a parallel-resonant circuit having a resonant frequency ($f_{res}$);
   b) a memory containing a plurality of tables and storing a plurality of modulation modes and pre-set switching angles, and having a first and second input;
   c) a generating device generating a plurality of control times for the pulse-controlled inverter, and being coupled in series with the memory;
   d) an identifying device identifying a system frequency range, having a system frequency of the current-source inverter as an input, and having an output coupled to the first input of the memory, wherein the memory selects a selected modulation mode from the plurality of modulation modes stored in memory based on the system frequency; and
   e) a divider having a first and second input, dividing the first input by the second input to form a factor ($f_1/f_{res}$), and having an output coupled to the second input of the memory, whereby a system frequency ($f_1$) is applied to the input of the identifying device and is also applied to the first input of the divider, and the resonant frequency ($f_{res}$) is applied to second input of the divider, wherein the memory determines the plurality of switching angles from the stored plurality of pre-set switching angles based on the factor ($f_1/f_{res}$), the selected modulation mode and the system frequency.

6. A trigger apparatus for a pulse-controlled inverter, which has a plurality of current switches, of a current-source inverter, comprising:
   a) an inductive load and a capacitive load being linked to the current switches, and forming a parallel-resonant circuit having a resonant frequency ($f_{res}$);
   b) a microcomputer, receiving the system frequency (f) and the resonant frequency ($f_{res}$), storing a plurality of tables, identifying a system frequency range, calculating a plurality of control times from the plurality of tables and system frequency range, and outputting the control times.

* * * * *